Patented Apr. 6, 1954

2,674,625

UNITED STATES PATENT OFFICE 2,674,625

PRODUCTION OF AMINOACETAL

Serge Tchelitcheff, Vitry-sur-Seine, France, assignor to Societe des Usines Chimiques Rhone-Poulenc, Paris, France, a French body corporate No Drawing. Application September 25, 1952, Serial No. 311,531

Claims priority, application France October 10, 1951

6 Claims. (Cl. 260—584)

This invention relates to the production of aminoacetal i. e. the compound of the formula:

$$(C_2H_5O)_2CH-CH_2NH_2$$

According to the present invention aminoacetal is prepared by reacting vinyl ethyl ether with nitrosyl chloride, treating the product with ammoniacal ethyl alcohol and subjecting the product thus obtained to reduction.

The direct product of the reaction of vinyl ethyl ether and nitrosyl chloride is probably chlornitroso diethyl ether but this is not isolated. The treatment with ammoniacal ethyl alcohol yields nitrosoacetal.

The reaction of vinyl ethyl ether and nitrosyl chloride takes place simply by addition of the reagents. It may be effected with or without catalysts and preferably at or below room temperature e. g. —20 to +10° C. The vinyl ethyl ether may be employed alone or in a solvent medium e. g. anhydrous diethyl ether. The treatment with ammoniacal ethyl alcohol is effected as a process continuous with said addition reaction.

The nitrosoacetal thus obtained is subjected to reduction by any of the well known methods of reducing nitroso groups to amino groups, the preferred methods being catalytic hydrogenation in the presence of Raney nickel catalyst and chemical reduction by means of zinc and acetic acid.

The following example will serve to illustrate the invention but is not to be regarded as limiting it in any way:

Example 65.5 g. (1 mol.) of nitrosyl chloride are run during ½ hour into a solution of 72 g. of vinyl ethyl ether in 250 cc. of anhydrous diethyl ether maintained at —20° C., and 670 cc. of an alcoholic solution of 1.5N ammonia are then added during 15 minutes. A solution containing 0.77 mol. of nitrosoacetal is obtained.

This solution is hydrogenated under a pressure of 70–100 kg. per sq. cm. in the presence of Raney nickel. On distillation, 31 g. of aminoacetal are obtained.

I claim:

1. Process for the production of aminoacetal which comprises reacting vinyl ethyl ether with nitrosyl chloride, treating the product with ammoniacal ethyl alcohol and subjecting the product to reduction by catalytic hydrogenation in the presence of Raney nickel catalyst.

2. Process for the production of aminoacetal which comprises reacting vinyl ethyl ether with nitrosyl chloride, at —20 to +10° C., treating the product with ammoniacal ethyl alcohol and subjecting the product to reduction by catalytic hydrogenation in the presence of Raney nickel catalyst.

3. Process for the production of aminoacetal which comprises reacting vinyl ethyl ether with nitrosyl chloride at —20 to +10° C. in a medium of anhydrous diethyl ether, treating the product with ammoniacal ethyl alcohol and subjecting the product to reduction by catalytic hydrogenation in the presence of Raney nickel catalyst.

4. Process for the production of aminoacetal which comprises reacting vinyl ethyl ether with nitrosyl chloride, treating the product with ammoniacal ethyl alcohol and subjecting the product to reduction by treatment with zinc and acetic acid.

5. Process for the production of aminoacetal which comprises reacting vinyl ethyl ether with nitrosyl chloride at —20 to +10° C., treating the product with ammoniacal ethyl alcohol and subjecting the product to reduction by treatment with zinc and acetic acid.

6. Process for the production of aminoacetal which comprises reacting vinyl ethyl ether with nitrosyl chloride at —20 to +10° C. in a medium of anhydrous diethyl ether, treating the product with ammoniacal ethyl alcohol and subjecting the product to reduction by treatment with zinc and acetic acid.

SERGE TCHELITCHEFF

No references cited.